United States Patent
Dhuse et al.

(10) Patent No.: US 10,747,616 B2
(45) Date of Patent: Aug. 18, 2020

(54) ADAPTING REBUILDING OF ENCODED DATA SLICES IN A DISPERSED STORAGE NETWORK

(71) Applicant: International Business Machines Corporation, Armonk, NY (US)

(72) Inventors: Greg R. Dhuse, Chicago, IL (US); Ravi V. Khadiwala, Bartlett, IL (US); Jason K. Resch, Chicago, IL (US); Ilya Volvovski, Chicago, IL (US); Wesley B. Leggette, Chicago, IL (US); Andrew D. Baptist, Mt. Pleasant, WI (US)

(73) Assignee: PURE STORAGE, INC., Mountain View, CA (US)

( * ) Notice: Subject to any disclaimer, the term of this patent is extended or adjusted under 35 U.S.C. 154(b) by 356 days.

(21) Appl. No.: 15/843,143

(22) Filed: Dec. 15, 2017

(65) Prior Publication Data
US 2018/0107550 A1    Apr. 19, 2018

Related U.S. Application Data

(63) Continuation-in-part of application No. 15/006,845, filed on Jan. 26, 2016, now Pat. No. 10,282,440.
(Continued)

(51) Int. Cl.
*G06F 16/00*    (2019.01)
*G06F 11/10*    (2006.01)
(Continued)

(52) U.S. Cl.
CPC .......... *G06F 11/1092* (2013.01); *G06F 3/064* (2013.01); *G06F 3/067* (2013.01);
(Continued)

(58) Field of Classification Search
CPC ............. G06F 16/2228; G06F 16/2272; G06F 11/1092; G06F 16/22; G06F 16/2365;
(Continued)

(56) References Cited

U.S. PATENT DOCUMENTS 4,092,732 A    5/1978 Ouchi
5,454,101 A    9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Merilyn P Nguyen
(74) *Attorney, Agent, or Firm* — Garlick & Markison; Timothy W. Markison; Bruce E. Stuckman

(57) ABSTRACT

A method for execution by a storage unit of a dispersed storage network includes updating a rebuilding task list based on detecting at least one storage error associated with storage of encoded data slices in a set of storage units that includes the storage unit. An encoded data slice is rebuilt based on the rebuilding task list and an affinity with the encoded data slice. The rebuilding task list is again updated based on detecting execution of at least one task of the rebuilding task list. The rebuilding task list is further updated based on detecting expiration of an execution time frame between sequential tasks of the rebuilding task list.

20 Claims, 6 Drawing Sheets

Related U.S. Application Data

(60) Provisional application No. 62/141,034, filed on Mar. 31, 2015.

(51) Int. Cl.
*G06F 3/06* (2006.01)
*G06F 16/22* (2019.01)
*G06F 16/23* (2019.01)
*G06F 16/25* (2019.01)

(52) U.S. Cl.
CPC .......... *G06F 3/0619* (2013.01); *G06F 16/22* (2019.01); *G06F 16/2365* (2019.01); *G06F 16/25* (2019.01)

(58) Field of Classification Search
CPC ........ G06F 16/25; G06F 3/0619; G06F 3/067; G06F 3/064; G06F 16/182; G06F 16/2379; H04L 67/1097
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,625,637 B2* | 1/2014 | Baptist | H04L 67/1097 370/474 |
| 9,652,470 B2* | 5/2017 | Volvovski | G06F 11/10 |
| 9,921,907 B2* | 3/2018 | Volvovski | G06F 11/10 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2013/0232378 A1* | 9/2013 | Resch | G06F 11/2056 714/6.24 |
| 2014/0122968 A1* | 5/2014 | Kazi | G06F 11/10 714/763 |
| 2015/0040134 A1* | 2/2015 | Leggette | G06F 3/0689 718/103 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Workmg Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

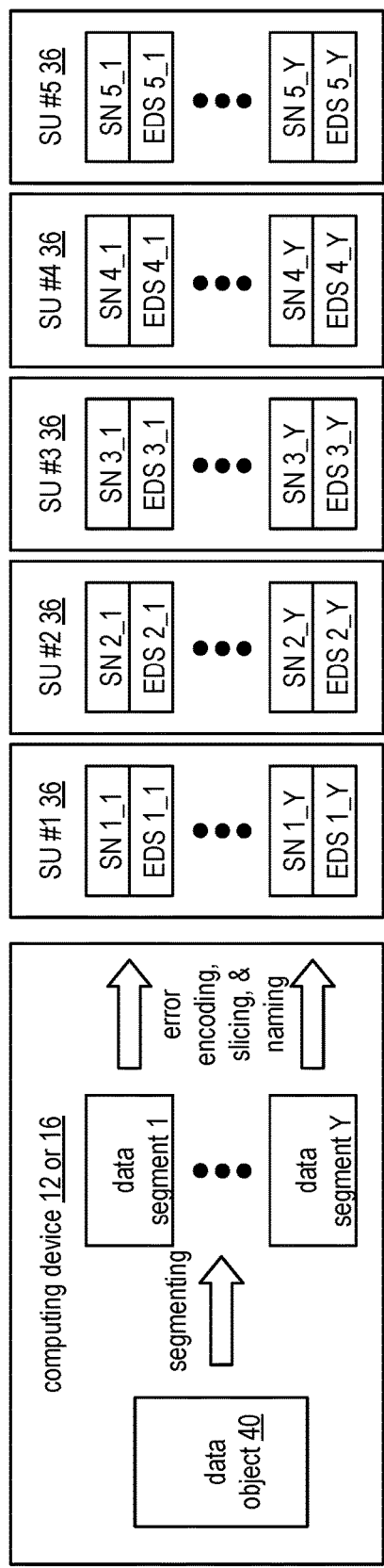
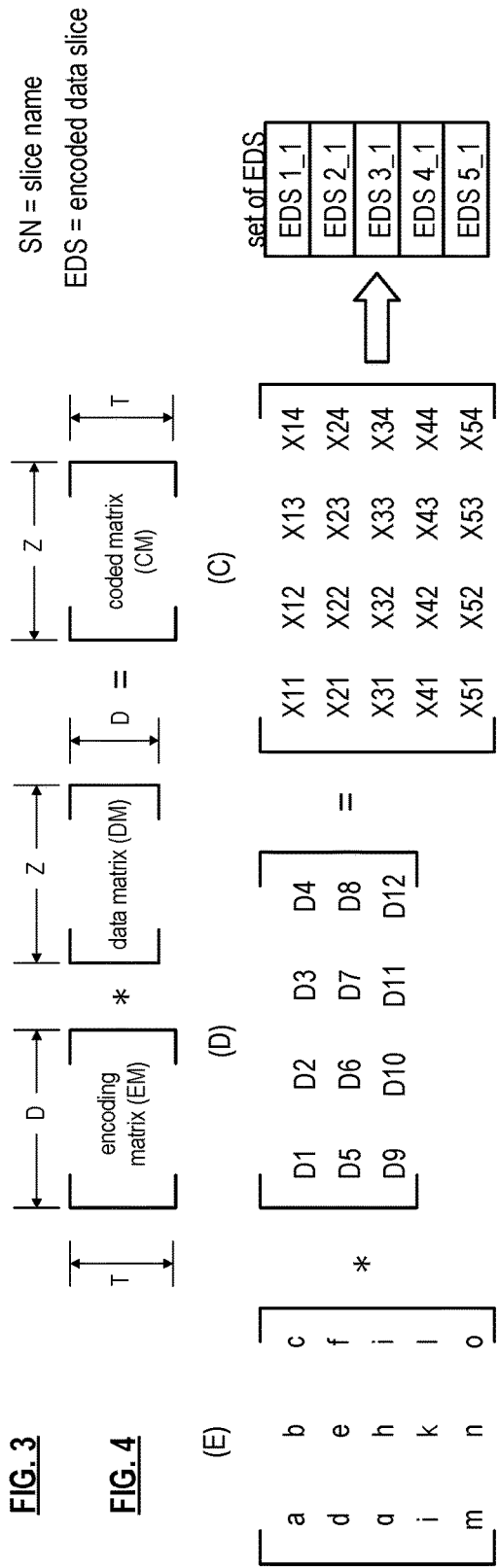
FIG. 3
FIG. 4
FIG. 5
FIG. 6

ADAPTING REBUILDING OF ENCODED DATA SLICES IN A DISPERSED STORAGE NETWORK

CROSS-REFERENCE TO RELATED APPLICATIONS

The present U.S. Utility Patent Applications claims priority pursuant to 35 U.S.C. § 120 as a continuation-in-part of U.S. Utility application Ser. No. 15/006,845, entitled "PRIORITIZING REBUILDING OF ENCODED DATA SLICES", filed Jan. 26, 2016, which claims priority pursuant to 35 U.S.C. § 119(e) to U.S. Provisional Application No. 62/141,034, entitled "REBUILDING ENCODED DATA SLICES ASSOCIATED WITH STORAGE ERRORS," filed Mar. 31, 2015, both of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
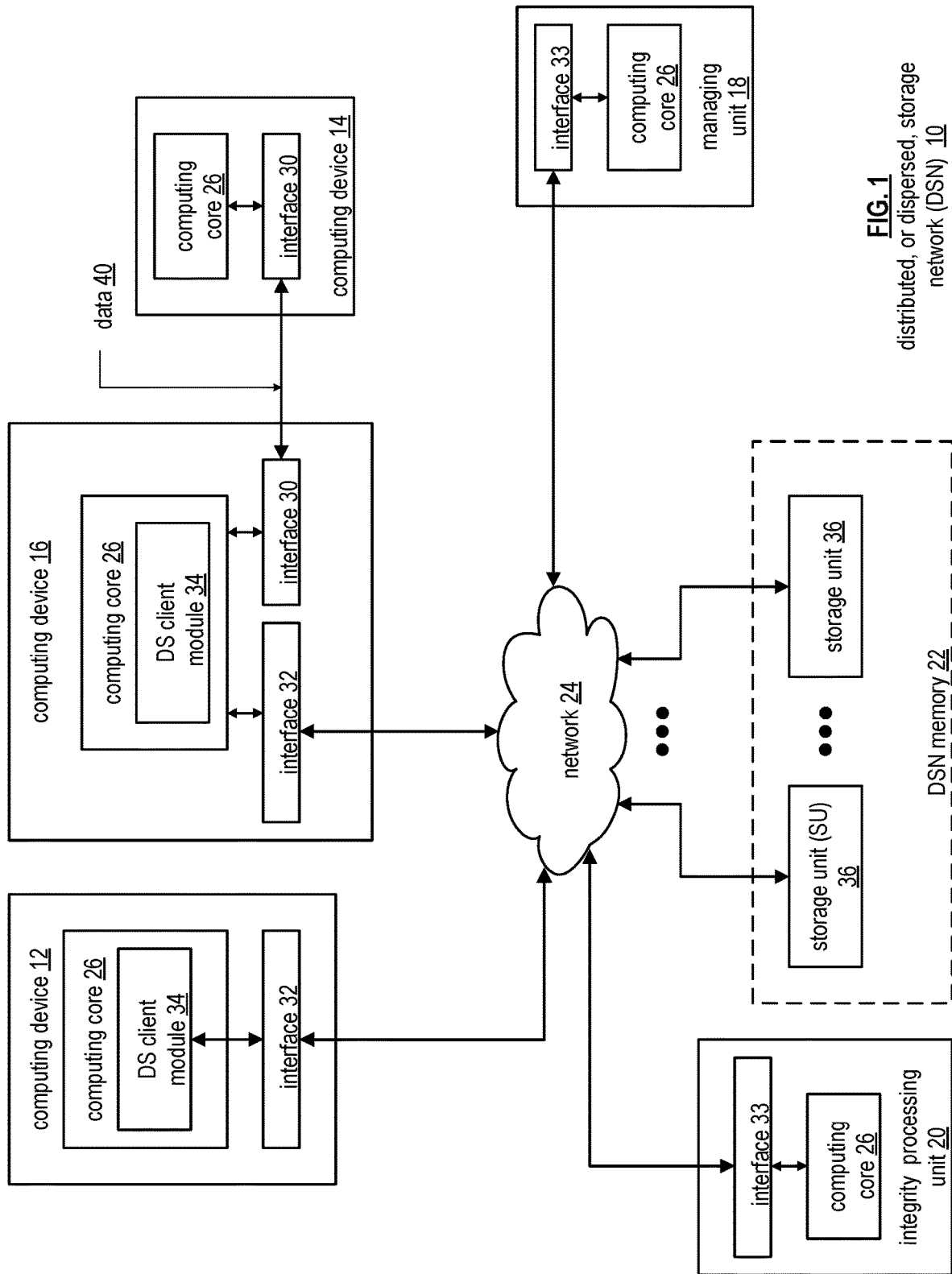
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
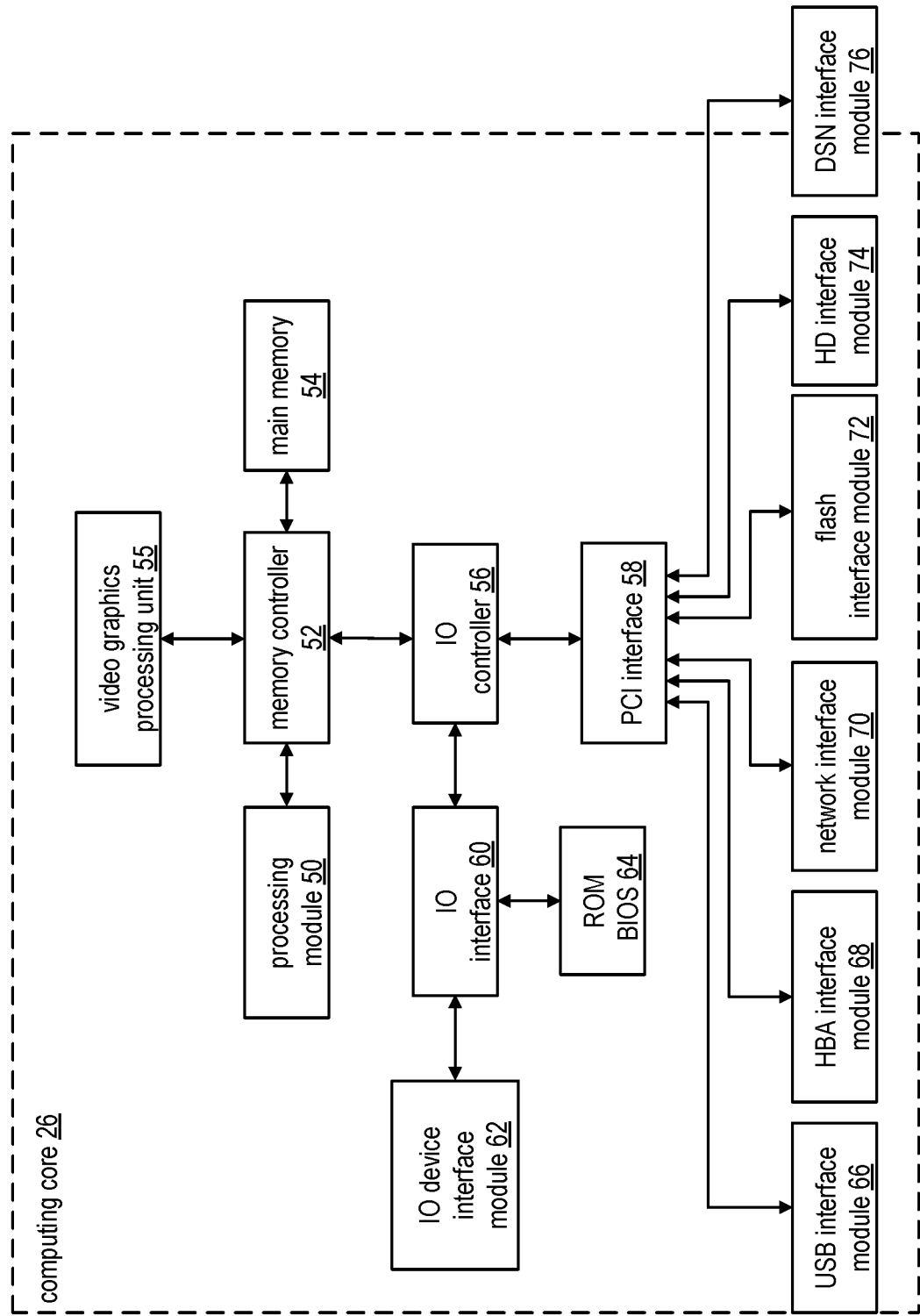
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the 10 device interface module 62 and/or the memory interface modules 66-76 may be collectively or individually referred to as 10 ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
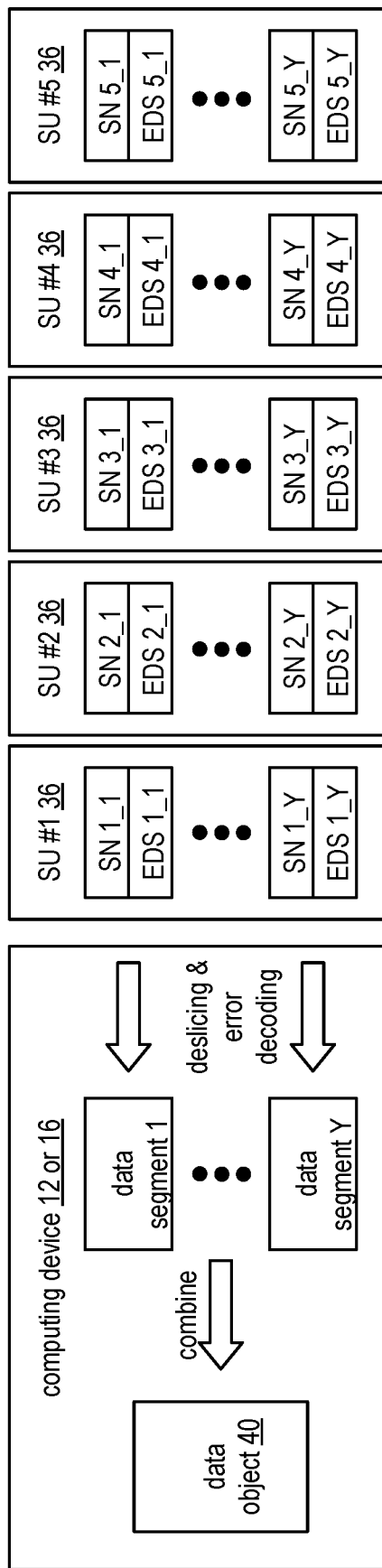
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
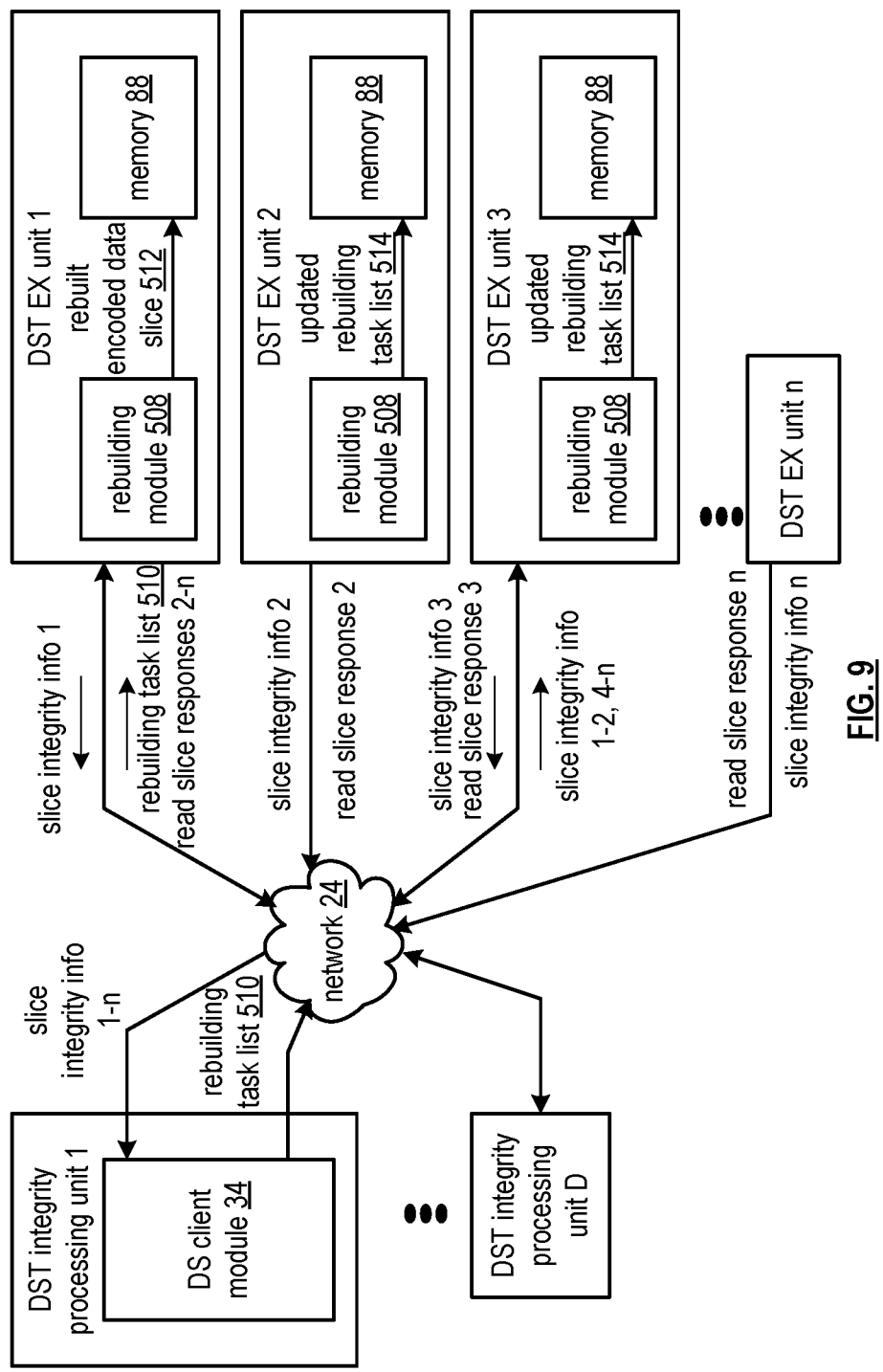
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a plurality of distributed storage and task (DST) integrity processing units 1-D, the network 24 of FIG. 1, and a set of DST execution (EX) units 1-n. Each DST integrity processing unit can be implemented utilizing the integrity processing unit 20 of FIG. 1. Each DST execution unit includes a rebuilding module 508 and a memory 88. The rebuilding module 508 can be implemented utilizing the computing core 26 of FIG. 2. The memory 88 can be implemented by utilizing the main memory 54 of FIG. 2. Each DST execution unit can be implemented utilizing the storage unit 36 of FIG. 1. The DSN functions to adapt rebuilding of encoded data slices associated with one or more storage errors.

Storage units can utilize the reception of listing requests to determine the current global state of recently scanned namespace ranges as an integral function of "co-operative rebuild scanning". However, there is other useful information communicated to other storage units during rebuilding which can also be leveraged. For example, rebuild modules in a DSN memory can also utilize current and accurate information pertaining to if and/or when a source becomes unhealthy, how unhealthy a given source is compared to other sources (i.e., how many slices is it missing), who should be responsible for rebuilding a given unhealthy source, if and/or when the responsible entity is derelict or deficient in their duties to rebuild, if and/or when an unhealthy source becomes healthy, and/or which namespace ranges have gone the longest without being checked for unhealthy sources.

Cooperative rebuild scanning which utilizes the reception of in-bound listing requests sent by rebuild modules can be utilized, but more information is available to leverage. For example, in a scheme involving rebuild mailboxes (either shared or disparate queues of unhealthy sources to be rebuilt), storage units that receive read requests from rebuild modules for slices belonging to unhealthy sources may presume that another rebuild module is in the process of rebuilding that source and therefore that it can be removed from its own mailbox (since another rebuild module has processed it). Likewise, a determination may be made that a certain rebuild module is being derelict in its rebuild functions if it fails to make listing, or read requests over a certain period of time, or is issuing them at too low (or suspiciously high) of a rate. This can trigger other rebuild modules to take over that rebuild module's task queue (or otherwise determined responsibilities). Deterministic or time-based functions such as a Distributed Agreement Protocol (DAP) or similar scheme can also be utilized to determine who is responsible for rebuilding a given unhealthy source. How unhealthy a given source is compared to other sources can be determined by listing, and for maximum utility in prioritizing rebuild tasks, it can be communicated to the rebuild module(s) responsible for its restoration. If and when a source becomes unhealthy can be determined in response to drive failure, and/or rebuilt entries may be inserted directly by computing devices which fail to fully write all their slices (or write them to temporary locations under a foster slice/target width/trimmed write scenario). With all of this information available to rebuild modules, more intelligent and responsive actions can be taken to recover the most unhealthy data as expeditiously as possible. Since normally reads are issued to only a read-threshold number of storage units rather than a full width, to maximize dissemination of the information, rebuild modules can purposely issue reads to a full width, or issue check requests to the storage units that don't get reads, for example, in order to signal their progress being made towards the rebuilding of a source to other rebuild modules.

In an example of operation of the adapting of the rebuilding, the DS client module 34 (e.g., of at least one of a DST integrity processing unit and/or of any DST execution unit) updates a rebuilding task list 510 based on detecting one or more storage errors associated with storage of encoded data slices in the set of DST execution units. For example, the DS client module 34 issues list slice requests, receives list slice responses as slice integrity information, detects a storage error, updates the rebuilding task list five and 10 to include an identifier of a slice name associated with the storage error, and publishes (e.g., sends), via the network 24, the updated rebuilding task list 514 to each of the storage units.

Having received the updated rebuilding task list 514, the DST execution unit 1 can interpret the rebuilding task list to identify an encoded data slice requiring rebuilding, where the encoded data slice is associated with the DST execution unit 1. For example, the rebuilding module 508 of the DST execution unit 1 compares slice names of a local slice list to slice names of the rebuilding task list. Having identified the encoded data slice requiring rebuilding, the DST execution unit 1 can facilitate the rebuilding of the encoded data slice to produce a rebuilt encoded data slice 512 for storage in the memory 88 of the DST execution unit 1. For example, the DST execution unit 1 issues, via the network 24, read slice requests to other DST execution units, recovers a data segment from encoded data slices of received read slice responses, and re-encodes the recovered data segment to produce the rebuilt encoded data slice 512 for storage in the memory 88.

The DST execution unit 2 can interpret the read slice requests from the DST execution unit 1 (e.g., and perhaps others) to update a local copy of the rebuilding task list. The updating can include removing one or more rebuilding tasks associated with encoded data slices of a set of encoded data slices that includes the encoded data slice that was rebuilt by the DST execution unit 1.

The DST execution unit 3 can interpret received list slice requests to update its local copy of the rebuilding task list with regards to the other encoded data slice not being associated with the list slice requests, for example, when a time frame between the receiving of list slice requests for the other encoded data slices is greater than a time threshold level (e.g., detect an unfavorable slice error scanning rate). The updating can further include adding additional rebuilding tasks to abate the slow scanning of slice errors. The DST execution unit 3 can perform the additional rebuilding task. For example, the rebuilding module of the DST execution unit 3 issues list slice requests to other DST execution units, receives list slice responses as slice integrity information, identifies slice errors, and/or updates its local copy of the rebuilding task list by storing the updated rebuilding task list 514 in the memory 88 of the DST execution unit 3.

In various embodiments, a processing system of a storage unit includes at least one processor and a memory that stores operational instructions, that when executed by the at least one processor cause the processing system to update a rebuilding task list based on detecting at least one storage error associated with storage of encoded data slices in a set of storage units that includes the storage unit. An encoded data slice is rebuilt based on the rebuilding task list and an affinity with the encoded data slice. The rebuilding task list is again updated based on detecting execution of at least one task of the rebuilding task list. The rebuilding task list is further updated based on detecting expiration of an execution time frame between sequential tasks of the rebuilding task list.

In various embodiments, the encoded data slice is associated with at least one data segment, and wherein the data segment was dispersed storage error encoded to produce a set of encoded data slices that includes the encoded data slice for storage in the set of storage units. In various embodiments, a scan for encoded data slice errors is performed and the at least one storage error is detected as a result of performing the scan. In various embodiments, updating the rebuilding task list includes modifying the rebuilding task list to include at least one task that addresses the at least one storage error. In various embodiments, updating the rebuilding task list includes generating an updated rebuilding task list. The updated rebuilding task list is transmitted to the set of storage units. In various embodiments, updating the rebuilding task list includes generating an updated rebuilding task list. An update notification is transmitted to the set of storage units in response to the generation of the updated rebuilding task list, and at least one of the set of storage units accesses the updated rebuilding task list in response to receiving the update notification.

In various embodiments, rebuilding the encoded data slice includes interpreting the rebuilding task list to identify a plurality of tasks associated with a rebuilding module of the storage unit. A plurality of priority levels corresponding to the plurality of tasks is generated, and the plurality of tasks are executed in accordance with the plurality of priority levels to rebuild the encoded data slice. In various embodiments, the plurality of priority levels are generated based on a calculated severity estimate and/or a calculated rebuild time. In various embodiments, the encoded data slice is rebuilt in response to a plurality of tasks of the rebuilding task list indicating that no other rebuilding module is designated to rebuild the encoded data slice within a rebuilding time frame.

In various embodiments, updating the rebuilding task list based on detecting the execution of the at least one task includes locating the least one task in a plurality of tasks of the rebuilding task list and removing the at least one task from the rebuilding task list to produce an updated rebuilding task list. In various embodiments, updating the rebuilding task list based on detecting the expiration of the execution time frame includes re-prioritizing tasks of the rebuilding task list in response to determining that the execution time frame has expired from a first task of the sequential tasks.

Figure 10:
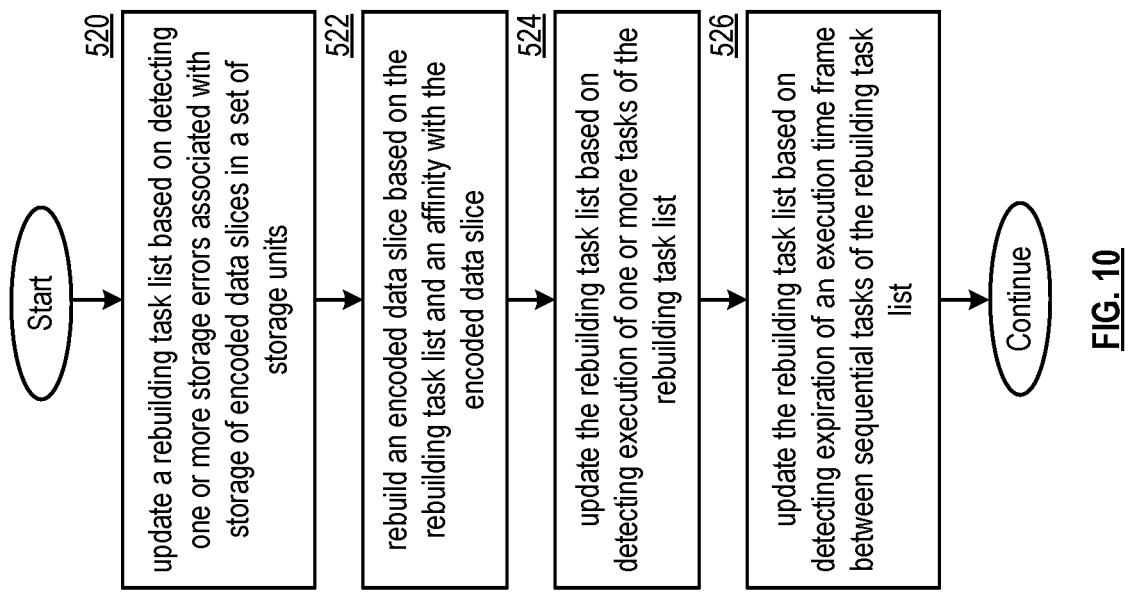
FIG. 10 is a logic diagram of an example of a method of adapting rebuilding of encoded data slices.

FIG. 10 is a flowchart illustrating an example of adapting rebuilding of encoded data slices. In particular, a method is presented for use in association with one or more functions and features described in conjunction with FIGS. 1-9, for execution by a dispersed storage and task (DST) integrity processing unit that includes a processor, a rebuilding module or other processing system of a DST execution unit that includes a processor, and/or via another processing system of a dispersed storage network that includes at least one processor and memory that stores instruction that configure the processor or processors to perform the steps described below.

The method includes step 520 where a processing system (e.g., of dispersed storage and task (DST) integrity processing unit and/or a DST execution unit) updates a rebuilding task list based on detecting one or more storage errors associated with storage of encoded data slices in a set of storage units. For example, the processing system scans for slice errors, detects the slice errors, modifies the rebuilding task list to include one or more tasks to address the detected slice errors, and/or publishes the rebuilding task list to other entities of a dispersed storage network (DSN) by transmitting the rebuilding task list or otherwise making the updated rebuilding task list to the other entities, for example, where the other entities receive notifications that the rebuilding task list has been updated and access the updated rebuilding task list in response.

The method continues at step 522 where the processing system rebuilds an encoded data slice based on the rebuilding task list and an affinity with the encoded data slice. For example, the processing system interprets the rebuilding task includes identify tasks associated with a rebuilding module; prioritizes the identified tasks based on one or more of a severity estimate, a time to rebuild, and/or a desired rebuilding schedule; and/or executes the prioritized tasks to rebuild encoded data slice (e.g., rebuilding encoded data slice associated with the rebuilding module when no other rebuilding module is expected to rebuild the encoded data slice within a desired rebuilding time frame).

The method continues at step 524 where the processing system updates the rebuilding task list based on detecting execution of one or more tasks of the rebuilding task list. For example, the processing system interprets one or more received messages to identify the execution of the one or more tasks, locates one or more tasks of the rebuilding task list associated with the identified one or more tasks, removes the located one or more tasks of the rebuilding task list to produce an updated rebuilding task list, and/or publishes the updated rebuilding task list to at least some of the entities of the DSN.

The method continues at step 526 where the processing system further updates the rebuilding task list based on detecting expiration of an execution time frame between sequential tasks of the rebuilding task list. For example, the processing system determines that the execution timeframe has expired from a first task of the two sequential tasks and re-prioritizes tasks of the rebuilding task list to facilitate a more timely execution of an original task of the rebuilding (e.g., a local rebuilding module performs the original task).

In various embodiments, a non-transitory computer readable storage medium includes at least one memory section that stores operational instructions that, when executed by a processing system of a dispersed storage network (DSN) that includes a processor and a memory, causes the processing system to update a rebuilding task list based on detecting at least one storage error associated with storage of encoded data slices in a set of storage units that includes the storage unit. An encoded data slice is rebuilt based on the rebuilding task list and an affinity with the encoded data slice. The rebuilding task list is again updated based on detecting execution of at least one task of the rebuilding task list. The rebuilding task list is further updated based on detecting expiration of an execution time frame between sequential tasks of the rebuilding task list.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/ or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit that includes a processor, the method comprises:
   receiving a rebuilding task list via a network;
   updating the rebuilding task list based on detecting at least one storage error associated with storage of encoded data slices in a set of storage units that includes the storage unit;
   rebuilding an encoded data slice based on the rebuilding task list and an affinity with the encoded data slice;
   updating the rebuilding task list based on detecting execution of at least one task of the rebuilding task list; and
   updating the rebuilding task list based on detecting expiration of an execution time frame between sequential tasks of the rebuilding task list.

2. The method of claim 1, wherein the encoded data slice is associated with at least one data segment, and wherein the data segment was dispersed storage error encoded to produce a set of encoded data slices that includes the encoded data slice for storage in the set of storage units.

3. The method of claim 1, further comprising performing a scan for encoded data slice errors, wherein the at least one storage error is detected as a result of performing the scan.

4. The method of claim 1, wherein updating the rebuilding task list includes modifying the rebuilding task list to include at least one task that addresses the at least one storage error.

5. The method of claim 1, wherein updating the rebuilding task list includes generating an updated rebuilding task list, further comprising transmitting the updated rebuilding task list to the set of storage units.

6. The method of claim 1, wherein updating the rebuilding task list includes generating an updated rebuilding task list, wherein an update notification is transmitted to the set of storage units in response to the generation of the updated rebuilding task list, and wherein at least one of the set of storage units accesses the updated rebuilding task list in response to receiving the update notification.

7. The method of claim 1, wherein rebuilding the encoded data slice includes:
   interpreting the rebuilding task list to identify a plurality of tasks associated with a rebuilding module of the storage unit;
   generating a plurality of priority levels corresponding to the plurality of tasks; and
   executing the plurality of tasks in accordance with the plurality of priority levels to rebuild the encoded data slice.

8. The method of claim 7, wherein the plurality of priority levels are generated based on at least one of: a calculated severity estimate or a calculated rebuild time.

9. The method of claim 1, wherein the encoded data slice is rebuilt in response to a plurality of tasks of the rebuilding task list indicating that no other rebuilding module is designated to rebuild the encoded data slice within a rebuilding time frame.

10. The method of claim 1, wherein updating the rebuilding task list based on detecting the execution of the at least one task includes:
    locating the at least one task in a plurality of tasks of the rebuilding task list; and
    removing the at least one task from the rebuilding task list to produce an updated rebuilding task list.

11. The method of claim 1, wherein updating the rebuilding task list based on detecting the expiration of the execution time frame includes re-prioritizing tasks of the rebuilding task list in response to determining that the execution time frame has expired from a first task of the sequential tasks.

12. A processing system of a storage unit comprises:
    at least one processor;
    a memory that stores operational instructions, that when executed by the at least one processor cause the processing system to:
       receive a rebuilding task list via a network;
       update the rebuilding task list based on detecting at least one storage error associated with storage of encoded data slices in a set of storage units that includes the storage unit;
       rebuild an encoded data slice based on the rebuilding task list and an affinity with the encoded data slice;
       update the rebuilding task list based on detecting execution of at least one task of the rebuilding task list; and
       update the rebuilding task list based on detecting expiration of an execution time frame between sequential tasks of the rebuilding task list.

13. The processing system of claim 12, wherein the encoded data slice is associated with at least one data segment, and wherein the data segment was dispersed storage error encoded to produce a set of encoded data slices that includes the encoded data slice for storage in the set of storage units.

14. The processing system of claim 12, wherein the at least one storage error is detected as a result of performing a scan for encoded data slice errors.

15. The processing system of claim 12, wherein updating the rebuilding task list includes modifying the rebuilding task list to include at least one task that addresses the at least one storage error.

16. The processing system of claim 12, wherein updating the rebuilding task list includes generating an updated rebuilding task list, and wherein the operational instructions, when executed by the at least one processor, further cause the processing system to transmit the updated rebuilding task list to the set of storage units.

17. The processing system of claim 12, wherein rebuilding the encoded data slice includes:
    interpreting the rebuilding task list to identify a plurality of tasks associated with a rebuilding module of the storage unit;
    generating a plurality of priority levels corresponding to the plurality of tasks; and
    executing the plurality of tasks in accordance with the plurality of priority levels to rebuild the encoded data slice.

18. The processing system of claim 12, wherein the encoded data slice is rebuilt in response to a plurality of tasks of the rebuilding task list indicating that no other rebuilding module is designated to rebuild the encoded data slice within a rebuilding time frame.

19. The processing system of claim 12, wherein updating the rebuilding task list based on detecting the expiration of the execution time frame includes re-prioritizing tasks of the rebuilding task list in response to determining that the execution time frame has expired from a first task of the sequential tasks.

20. A computer readable storage medium comprises:
    at least one memory section that stores operational instructions that, when executed by a processing system of a dispersed storage network (DSN) that includes a processor and a memory, causes the processing system to:
    receive a rebuilding task list via a network;
    update rebuilding task list based on detecting at least one storage error associated with storage of encoded data slices in a set of storage units;
    rebuild an encoded data slice based on the rebuilding task list and an affinity with the encoded data slice;
    update the rebuilding task list based on detecting execution of at least one task of the rebuilding task list; and
    update the rebuilding task list based on detecting expiration of an execution time frame between sequential tasks of the rebuilding task list.

* * * * *